(12) United States Patent
Koermer et al.

(10) Patent No.: US 7,150,854 B2
(45) Date of Patent: Dec. 19, 2006

(54) DEVICE FOR GENERATING AQUEOUS CHLORINE DIOXIDE SOLUTIONS

(75) Inventors: Gerald S. Koermer, Roseland, NJ (US); Barry K. Speronello, Montgomery Township, NJ (US); Linda Hratko, Colonia, NJ (US)

(73) Assignee: Engelhard Corporation, Iselin, NJ (US)

( * ) Notice: Subject to any disclaimer, the term of this patent is extended or adjusted under 35 U.S.C. 154(b) by 320 days.

(21) Appl. No.: 10/102,382

(22) Filed: Mar. 19, 2002

(65) Prior Publication Data
US 2003/0180384 A1    Sep. 25, 2003

(51) Int. Cl.
A61L 2/18    (2006.01)
A61L 9/00    (2006.01)
A01N 59/08    (2006.01)
B01J 19/00    (2006.01)
C02F 5/02    (2006.01)

(52) U.S. Cl. .................. 422/37; 252/175; 252/180; 422/5; 422/29; 422/43; 424/661; 424/665

(58) Field of Classification Search ............... 424/489, 424/405, 411, 443, 484
See application file for complete search history.

(56) References Cited

U.S. PATENT DOCUMENTS

| 5,091,107 A |   | 2/1992  | Hutchings ............. 252/187.21 |
| 5,126,070 A | * | 6/1992  | Leifheit et al. ......... 252/186.36 |
| 5,306,440 A | * | 4/1994  | Ripley et al. ........... 252/186.33 |
| 5,360,609 A |   | 11/1994 | Wellinghoff ............. 514/772.3 |
| 5,407,656 A | * | 4/1995  | Roozdar ..................... 423/477 |
| 5,631,300 A | * | 5/1997  | Wellinghoff ............. 514/772.3 |
| 5,650,446 A |   | 7/1997  | Wellinghoff et al. ..... 514/772.3 |
| 5,695,814 A |   | 12/1997 | Wellinghoff et al. ........ 427/213 |
| 5,705,092 A | * | 1/1998  | Wellinghoff et al. ... 252/187.21 |
| 5,705,902 A |   | 1/1998  | Merritt et al. ......... 252/187.21 |
| 5,707,739 A |   | 1/1998  | Wellinghoff et al. ........ 428/403 |
| 5,888,528 A |   | 3/1999  | Wellinghoff et al. ........ 424/405 |
| 5,922,776 A |   | 7/1999  | Wellinghoff et al. ..... 514/772.3 |
| 5,980,826 A |   | 11/1999 | Barenberg et al. ............. 422/37 |
| 6,077,495 A |   | 6/2000  | Speronello et al. ......... 423/477 |
| 6,174,508 B1 |  | 1/2001  | Klatte .................... 423/245.1 |
| 6,277,408 B1 |  | 8/2001  | Wellinghoff et al. ........ 424/473 |
| 6,764,661 B1 | * | 7/2004 | Girard ........................ 422/305 |
| 2005/0224750 A1 | * | 10/2005 | Yang et al. ............... 252/186.1 |

FOREIGN PATENT DOCUMENTS

| EP | 0230133 A1 | * | 7/1987 |
| EP | 0 423 817 A2 |   | 4/1991 |
| EP | 0 611 162 B1 |   | 11/1998 |
| JP | 60215863 A | * | 10/1985 |
| JP | 02055201 A | * | 2/1990 |

OTHER PUBLICATIONS

XP-002245546, 1997, Derwent Publications Ltd.
XP-002245547, 1999, Derwent Publications Ltd.
XP-002245548, 2002, Derwent Publications Ltd.

* cited by examiner

Primary Examiner—S. Tran
(74) Attorney, Agent, or Firm—Raymond F. Keller

(57) ABSTRACT

The invention pertains to a device for generating aqueous chlorine dioxide solutions when the device is contacted with liquid water. The device comprises an alkali metal or alkaline earth metal chlorite, e.g., sodium chlorite, and a chemical reagent comprising an acid or a material capable of releasing an acid upon exposure to liquid water, e.g., sodium bisulfate. The chlorite and the reagent are either combined as a mixture or are disposed as separate components adhered to the surface of one or more substrates. Upon exposure to liquid water, the chlorite and the reagent produce boundary layers. The chlorite and the reagent are disposed upon, and adhered to, the surface(s) of the substrates in a manner such that upon exposure to liquid water, the chlorite boundary layer comes into contact with the reagent boundary layer to thereby produce an aqueous chlorine dioxide solution.

19 Claims, No Drawings

DEVICE FOR GENERATING AQUEOUS CHLORINE DIOXIDE SOLUTIONS

FIELD OF THE INVENTION

The present invention relates to a device for generating aqueous chlorine dioxide solutions when the device comes into contact with liquid water.

BACKGROUND OF THE INVENTION

Chlorine dioxide is a well-known germicidal and deodorizing agent. It is known that chlorine dioxide may be generated by exposure of a combination of a chlorite and an acid to moisture, i.e., atmospheric moisture and/or liquid water. In general, prior art methods of generating aqueous chlorine dioxide solutions involve the addition of a massive body, i.e., tablets, pills, bricks capsules, sachets, etc., to liquid water. These prior art methods are disadvantageous in that they entail a considerable period of time for dissolution of the tablets, pills, bricks, etc. and penetration of water into sachets.

Chlorine dioxide is often generated, particularly in large scale, by rapidly mixing highly concentrated solutions of a chlorite and an acid. These prior art methods are not appropriate for small scale operations where mixing and handling of highly acid and/or hazardous chemicals are not desired or are not feasible. Moreover, if the components are utilized in the form of a mixture, prior art methods entail the possibility of premature release of chlorine dioxide, reduced storage stability and shelf life, and for expensive packaging.

The present invention permits the rapid release of relatively small quantities of chlorine dioxide in liquid water as needed and is therefore quite useful for sterilizing water such that it is potable and useful as a germicidal liquid. Furthermore, the present invention lends itself to the separation of the reaction precursors into discrete zones or domains, thereby resulting in increased shelf life and the avoidance of expensive packaging.

SUMMARY OF THE INVENTION

The invention pertains to a device for generating aqueous chlorine dioxide solutions when the device comes into contact with liquid water. The device comprises one or more substitutes upon which is adhered (with the aid of an adhesive layer on the surface of the substrates) an alkali metal or alkaline earth metal chlorite and the chemical reagent comprising an acid or material which produces an acid upon exposure to liquid water.

DETAILS OF THE INVENTION

The invention pertains to a device for generating aqueous chlorine dioxide solutions when the device is contacted with liquid water. In its broadest sense, the device comprises an alkali metal or alkaline earth metal chlorite which produces a boundary layer upon exposure to liquid water and a chemical reagent, e.g., an acid or a material which produces an acid upon exposure to liquid water, which produces a boundary layer upon exposure to liquid water. The chlorite and the reagent are adhered to the surface(s) of one or more substrates and are disposed upon the surface(s) of the substrate in a manner such that upon exposure to liquid water, the chlorite boundary layer comes into contact with the reagent boundary layer to thereby produce an aqueous chlorine dioxide solution.

The term "boundary layer" is well known in the field of fluid mechanics. As applied to the present invention, when the substrate containing the layer or coating of the chlorite and the reagent is contacted with water, the soluble material in the layer or coating begins to dissolve. As dissolution of the chlorite and the reagent by the liquid water occurs, a boundary layer forms next to the substrate. In such case, the "boundary layer" would comprise a relatively thin region of liquid adjacent to the surface of the substrate where the concentration of the salts of the chlorite and the reagent is significantly greater than that of the bulk liquid. As a result of the high concentration of such salts in the boundary layer, chlorine dioxide forms rapidly. Such rapid formation of chlorine dioxide occurs because the liquid water penetrates the thin layer of the salts adhered to the substrate thus swiftly establishing the boundary layer.

The substrates useful for the present invention may be nonporous or porous, inflexible or flexible. They may be flat, ridged, circular, tubular, etc. Materials useful for the substrate are those which would not interfere with the generation of chlorine dioxide and include metals, glass, thermoset polymers, thermoplastic polymers, etc.

In one embodiment of the present invention, a single substrate is employed and the chlorite and the reagent are present as a physical mixture of powders adhered to the surface of the substrate. In a variation of such embodiment, the single substrate is comprised of a flexible material and the chlorite and the reagent are disposed upon, and adhered to, different regions on the surface of the substrate in a manner such that when the flexible material is rolled into a tube or cylinder, the chlorite and the reagent will be facing each other.

The chlorite and the reagent are adhered to the surface(s) of one or more substrate(s) in the form of one or more layers, each layer preferably having a thickness of not greater than about ⅛ inch. The chlorite and the reagent are conveniently adhered to the surface(s) of the substrate(s) by first applying a layer or coating of any commercially available adhesive to the surface(s). Suitable adhesives are those which are preferably not water-soluble, impart no undesirable taste to the water, do not interfere with the reaction between the chlorite and the reagent and do not react with the chlorite.

In another embodiment of the invention, two substrates are employed and the chlorite and the reagent are adhered to the surface of each substrate and disposed on the surfaces of the substrates such that they are preferably substantially facing each other in order to insure good contact between the boundary layers of the chlorite and the reagent when the device comes into contact with liquid water. In this embodiment, the chlorite and the reagent are kept apart from one another by the use of spacers at the ends of the substrates. Typically, such spacers will have a maximum height of about ¼ inch and may be constructed from any readily available material which will not interfere with the generation of chlorine dioxide, e.g., glass, wood, plastic, etc. In a further variation of such embodiment, two substrates coated with the chlorite and the reagent are separated by a solid, but permeable membrane layer, i.e., thereby creating a "sandwich".

The chlorite may be any commercially available alkali metal or alkaline earth metal chlorite. Examples of suitable metal chlorites include sodium chlorite, potassium chlorite, barium chlorite, calcium chlorite, magnesium chlorite, etc. The preferred metal chlorite is sodium chlorite.

The chemical reagent comprises an acid or a material which will produce an acid upon exposure to liquid water. Suitable reagents include solid inorganic and organic acids such as sodium acid phosphate, adipic, tartaric, citric, sulfamic, malic, maleic, oxalic, glutaric, etc. Suitable materials which will produce an acid upon exposure to liquid water include sodium bisulfate which is the preferred reagent.

The amount of metal chlorite and chemical reagent layered or coated and adhered to the surface(s) of the substrate(s) will vary depending upon the desired concentration of the chlorine dioxide solution. Typically, the molar ratio of the metal chlorite to the chemical reagent will be in the range of about 0.5:1 to about 2.0:1.

Optionally, one or more desiccants may be present in admixture with the metal chlorite and/or the chemical reagent. If employed, the desiccant will be present in the amount of about 5 to about 40 wt. %, preferably 5 to 15 wt. %, based on the total amount of chlorite plus desiccant and/or reagent plus desiccant. Suitable desiccants include magnesium chloride, calcium chloride and mixtures thereof. Also optionally, one or more promoters may be present in admixture with the metal chlorite and/or the chemical reagent. If employed, the promoter will be present in the amount of about 0.1 to about 10 wt %, preferably 1 to 5 wt %, based on the total amount of chlorite, desiccant (if employed) and promoter and/or reagent plus desiccant (if employed) and promoter. Suitable promoters include a chloride salt, e.g., sodium chloride or potassium chloride, and chloroisocyanuric acid or a salt thereof, e.g., the sodium or potassium salt of dichloroisocyanuric acid or trichloroisocyanuric acid. As a further option, one or more effervescing agents may be present in admixture with the metal chlorite and/or the chemical reagent. If employed, the effervescing agent will be present in the amount of about 5 to about 25 wt. %, preferably 5 to 15 wt. %, based on the total amount of chlorite, desiccant (if employed), promoter (if employed) and effervescing agent and/or reagent, desiccant (if employed), promoter (if employed) and effervescing agent. A suitable effervescing agent is sodium bicarbonate.

By way of a further embodiment, the metal chlorite and/or the chemical reagent may be impregnated onto a carrier and the impregnated carrier is then adhered and disposed on the substrate. The advantage of this embodiment is that the particle size of the coating of the metal chlorite and/or the chemical reagent may be controlled and direct contact of the metal chlorite and/or the chemical reagent with the adhesive is minimized. Suitable porous carriers include alumina, silica, a zeolite, a molecular sieve, a clay and mixtures thereof.

The following nonlimiting examples shall serve to illustrate the present invention. Unless otherwise indicated, all parts and percentages are on a weight basis. In all of the examples, the metal chlorite was technical grade sodium chlorite (80%). The concentration of chlorine dioxide in solution was determined by UV-visible spectroscopy using a Spectral Instruments spectrometer with a fiber optic dip probe with a 1 cm path length.

EXAMPLE 1

This example demonstrates the rapid formation of chlorine dioxide from a thin layer of powder. A glass microscope slide was coated with a thin layer of adhesive (obtained from "3M", Item #4224-NF, Clear, Pressure Sensitive Adhesive). The slide was placed in an oven at 40° C. for 30 minutes in order to cure the adhesive (such curing removes the water from the adhesive formulation). A portion of a powdered formulation was placed onto the adhesive layer and was pressed into the adhesive layer with another slide. The powdered formulation consisted of, on a wt. % dry basis: 26% technical grade sodium chlorite, 7% of the sodium salt of dichloroisocyanuric acid, 26% sodium bisulfate, 21% magnesium chloride and 20% sodium chloride, 0.075 g of the powdered formulation adhered to the slide. The slide was placed in 200 ml water and after 2 minutes, a concentration of 17.7 ppm of chloride dioxide resulted as measure by UV-visible spectroscopy. This constitutes a yield of 4.7% wt/wt yield.

EXAMPLE 2

In this example, the metal chlorite and the chemical reagent were applied in separate, non-overlapping zones such that the reactants were not in contact with one another nor could the boundary layer of one reactant contact the boundary layer of the other reactant. A glass slide was coated with the adhesive described in Example 1. After the adhesive was cured, a line was drawn horizontally approximately in the middle of the coated area of the slide. 0.021 g sodium chlorite was placed on the adhesive below the line and 0.20 g of sodium bisulfate was placed on the adhesive above the line. The slide was then placed in 200 g of water. Essentially no chlorine dioxide was produced.

EXAMPLE 3

This example demonstrates that the reactants may be physically separated in zones on substrates such that they are not in physical contact with one another and chlorine dioxide will nevertheless be generated, provided that the zones are disposed on the substrates such that the boundary layers produced by the reactants come into contact with one another. Two identical polyethylene strips were cut from thick polyethylene stock. The strips were coated with the adhesive and cured as described in Example 1. 0.086 g of technical grade sodium chlorite was placed on the adhesive of one strip and 0.236 g of sodium bisulfate was placed on the adhesive of the other strip. Spacers consisting of ⅛ inch thick pieces of polyethylene were attached to the ends of the strips and the second strip was placed on top of the first strip such that the zone of the sodium chlorite was facing the zone of the sodium bisulfate. The strips were bound together using rubber bands, although other methods could have been used. The assembly was then placed in 200 ml of tap water. Within 2 minutes, a 25.6 ppm solution of chlorine dioxide resulted as determined by UV-visible spectroscopy. This constitutes a yield of 1.6 % of chlorine dioxide (wt./wt.). It is clear that the spacing of the slides (as a result of the spacers at the ends of the slides) controls the ingress of the water to the coated surfaces of the slides. Since the coated surfaces are in close proximity, i.e., about ⅛ inch from one another, the solution between the slides contains a high concentration of reactive precursors to chlorine dioxide. As a result the generation of chlorine dioxide proceeds quite rapidly. It should be noted that the spacers may be of various designs and configurations so as to control water ingress and egress within the space between the two coated strips.

EXAMPLE 4

This example serves to illustrate the benefits of the use of a promoter to increase the yield of chlorine dioxide. 0.056 g of technical grade sodium chlorite was coated onto a polyethylene strip and 0.02 g of sodium dichloroisocyanuric acid plus 0.05 g of sodium bisulfate were coated onto an identical second strip (the coating process included the use of the same adhesive as described in Example 1). 0.02 inch thick spacers were placed around the perimeter of one polyethylene strip. There were several gaps in the spacer perimeter to allow for water ingress and egress. The two strips were bound together with the coated sides facing each other but separated by the spacers. The bound assembly was placed in 200 ml of tap water. After 2 minutes, a solution containing 58 ppm chlorine dioxide resulted as measured by UV-visible spectroscopy. This result represented a yield of 9.2% (wt./wt.).

EXAMPLE 5

This example compares the yield associated with the use of a promoter (i.e., sodium dichloroisocyanuric acid, referred to below as "NaDCCA") present in at least one of the reactant moieties versus no promoter with higher amounts of the reactant moieties. This example was carried in accordance with the same procedure as in Example 4 and the results are set forth in the table below.

| Experiment | 5A | 5B |
|---|---|---|
| $NaClO_2$ (g) | 0.086 | 0.054 |
| NaDCCA (g) | 0.0 | 0.01 |
| $NaHSO_4$ (g) | 0.236 | 0.165 |
| Total (g) | 0.322 | 0.229 |
| Water, ml | 200 | 200 |
| $ClO_2$, ppm | 25.6 | 62.3 |
| Wt. % Yield | 1.6 | 5.4 |

From the table set forth above, it is seen that even though Experiment 5A utilized more reactive moieties, it delivered less chlorine dioxide than Experiment 5B which contained the promoter.

EXAMPLE 6

This example illustrates the use of a combination of two different types of substrates: a glass slide and a microporous tape.

One side of a 1×3 inch glass slide was coated with the adhesive and dried as described in Example 1. A ⅛ inch strip of polyethylene was placed on the side of the slide containing the adhesive adjacent to both long edges of the slide to prevent powder from sticking along the edges. A layer of a mixture of 0.0329 g sodium bisulfate and 0.13 g of sodium dichloroisocyanuric acid which mixture had been ground and screened to −100 mesh was then placed on the coated glass slide. Thereafter, the polyethylene strips were removed from the slide.

A strip of "3M MICROPORE" tape was cut to a 1×3 inch size. Polyethylene strips ⅛ inch wide were placed along the long edges of the sticky side of the tape. A layer of 0.0375 g of technical grade sodium chlorite was then placed onto the tape and the polyethylene strips were then removed. A piece of #5 "WHATMAN" filter paper was cut into a rectangle of ¾×3 inches and placed onto the glass slide over the bisulfate/NaDCCA powder mixture. The "MICROPORE" tape (powder side down) was placed over the filter paper on top of the slide and the long edges of the tape and the glass slide were pressed together.

An eight ounce clear jar was filled with 200 ml of tap water and a stirring bar was placed in the jar, and the jar was placed on a stirring plate. Stirring was activated and the slide was placed in the jar and a lid was placed on the jar; the lid for the jar contained a hole which accommodates a 1 cm fiber optic dip probe attached to a UV-visible spectrometer. The evolution of chlorine dioxide was followed as a function of time. It was found that the total wt. % yield of chlorine dioxide based on the weight of the powders in the device was 10.7%. 70% of the total chlorine dioxide release occurred within 5 minutes.

EXAMPLE 7

This example illustrates the benefit of employing an effervescing agent, i.e., sodium bicarbonate, in the formulation. A 1 inch by 3 inches glass microscope slide was coated with a thin layer of adhesive (obtained from "3M", Item #4224-NF, Clear, Pressure Sensitive Adhesive). The adhesive was cured by placing it in an oven at 40° C. for 30 minutes. Polyethylene strips, ⅛ inch wide, were placed along both long edges of the slide. Thereafter, a layer of a −100 mesh mixture of sodium dichloroisocyanuric acid (0.172 g) and sodium bisulfate (0.0429 g) was placed onto the adhesive on the slide, and the polyethylene strips were then removed. Two ⅛ inch wide strips of polyethylene were placed onto the long edges of the sticky side of a 1 inch by 3 inches strip of "3M MICROPORE" tape. A layer of a mixture of 0.0421 g of technical grade sodium chlorite and 0.0105 g of sodium bicarbonate was placed onto the sticky side of the tape, and the polyethylene strips were then removed. A ¾ inch by 3 inches piece of #4 "WHATMAN" filter paper was then placed onto the glass slide over the reactant chemicals. The "MICROPORE" tape (powder side down) was then placed over the slide and the filter paper. The device was then assembled by pressing the long edges of the tape and slide together.

An eight ounce clear jar was filled with 200 ml of tap water and a stirring bar was placed in the jar, and the jar was placed on a stirring plate. Stirring was activated and the slide was placed in the jar and a lid was placed on the jar; the lid for the jar contained a hole which accommodates a 1 cm fiber optic dip probe attached to a UV-visible spectrometer. The evolution of chlorine dioxide was followed as a function of time. It was found that the is wt. % yield of chlorine dioxide based on the weight of the powders in the device was 9.6%. The final wt. % yield of chlorine dioxide at 5 minutes was 8.7% (wt./wt.).

EXAMPLE 8

Two 1 inch by 3 inches glass microscope slides were each coated on one side with a thin layer of adhesive (obtained from "3M", Item #4224-NF, Clear, Pressure Sensitive Adhesive). The adhesive was cured by placing it in an oven at 40° C. for 30 minutes. 0.043 g of technical grade sodium chlorite was spread onto the adhesive on one slide. 0.0132 g of sodium dichloroisocyanuric acid and 0.0332 g of technical grade sodium chlorite (both screened to −100 mesh) were placed on the adhesive of the other slide. A piece of tea bag paper, 1 inch by 3 inches was cut and placed over one of the slides (powder side up). The other slide was placed over the tea bag paper with the powder side down. The two slides and tea bag paper were held together using a rubber band at each end of the slides.

An eight ounce clear jar was filled with 200 ml of tap water and a stirring bar was placed in the jar, and the jar was placed on a stirring plate. Stirring was activated and the slide was placed in the jar and a lid was placed on the jar; the lid for the jar contained a hole which accommodates a 1 cm fiber optic dip probe attached to a UV-visible spectrometer. The evolution of chlorine dioxide was followed as a function of time. It was found that the final wt. % yield of chlorine dioxide based on the weight of the powders in the device was 14.1%. The final wt. % yield of chlorine dioxide at 5 minutes was 8.1% (wt./wt.).

What is claimed is:

1. A method for generating an aqueous chlorine dioxide solutions comprising contacting a device with liquid water, the device comprising:
   a chlorite which produces a boundary layer upon exposure to liquid water, the chlorite being selected from the group consisting of an alkali metal chlorite and an alkaline earth metal chlorite, the chlorite being adhered to a substrate, the chlorite boundary layer being formed next to the substrate, and
   a chemical reagent which produces a boundary layer upon exposure to liquid water, the reagent being adhered to the same or a different substrate as the chlorite, the reagent boundary layer being formed next to the substrate;
   wherein the chlorite and the reagent being spatially related such that upon exposure of the device to liquid water, the chlorite boundary layer comes into contact with the reagent boundary layer to thereby produce an aqueous chlorine dioxide solution, wherein the chlorite and the reagent are adhered to a surface of the substrate in the form of one or more layers, and wherein the chlorite is disposed as a first layer adhered to the surface of a first substrate and the reagent is disposed as a second layer adhered to the surface of a second substrate, said first and second layers disposed such that they are substantially facing each other, said first and second substrates being physically separated from each other by spacer means which prevent physical contact of the first and second layers.

2. The method of claim 1 wherein the chlorite comprises sodium chlorite.

3. The method of claim 1 wherein the chemical reagent comprises an acid or a material which produces an acid upon exposure to liquid water.

4. The method of claim 3 wherein the chemical reagent comprises sodium bisulfate.

5. The method of claim 1 further comprising one or more desiccants present in admixture with the chlorite and/or the reagent.

6. The method of claim 5 wherein the desiccant is selected from the group consisting of magnesium chloride, calcium chloride and mixtures thereof.

7. The method of claim 1 further comprising one or more promoters present in admixture with the chlorite and/or the reagent.

8. The method of claim 7 wherein the promoter comprises a chloroisocyanuric acid or a salt thereof alone or in admixture with a chloride salt.

9. The method of claim 8 wherein the promoter comprises the sodium or potassium salt of dichloroisocyanuric acid alone or in admixture with sodium or potassium chloride.

10. The method of claim 8 wherein the promoter comprises the sodium or potassium salt of trichloroisocyanuric acid alone or in admixture with sodium or potassium chloride.

11. The method of claim 1 further comprising an effervescing agent present in admixture with the chlorite and/or the reagent.

12. The method of claim 11 wherein the effervescing agent comprises sodium bicarbonate.

13. The method of claim 1 wherein the chlorite layer and the reagent layer have a thickness of not greater than about 1/8 inch.

14. The method of claim 1 wherein the spacer means have a maximum height of about 1/4 inch.

15. The method of claim 1 wherein the first substrate is comprised of a porous material and contains a layer of adhesive interposed between the surface of the first substrate and the chlorite, and the second substrate is comprised of a nonporous material and contains a layer of adhesive interposed between the surface of the second substrate and the reagent.

16. The method of claim 1 wherein the first substrate is comprised of a nonporous material and contains a layer of adhesive interposed between the surface of the first substrate and the chlorite, and the second substrate is comprised of a porous material and contains a layer of adhesive interposed between the surface of the second substrate and the reagent.

17. The method of claim 13 wherein said first and second substrates being physically separated from each other by permeable membrane means which prevent physical contact of the first and second layers.

18. The method of claim 1 wherein at least one of the metal chlorite and the chemical reagent is impregnated onto a carrier and the impregnated carrier is then adhered and disposed on the substrate.

19. The method of claim 18 wherein the carrier is selected from the group consisting of alumina, silica, a zeolite, a molecular sieve, a clay and mixtures thereof.

* * * * *